United States Patent
Barthelet et al.

(10) Patent No.: US 7,545,115 B2
(45) Date of Patent: Jun. 9, 2009

(54) MOTOR CONTROL AND DRIVER FOR ELECTRIC BOOSTING APPLICATION

(75) Inventors: Pierre Barthelet, Thaon-les-Vosges (FR); Nicolas Devulder, Thaon-les-Vosges (FR); Chris Greentree, Redondo Beach, CA (US); Cedric Lorant, Thaon-les-Vosges (FR); Stanislaus Pouget, Thaon-les-Vosges (FR); Kevin Stalsberg, St. Paul, MN (US); Alain Wesquet, Thaon-les-Vosges (FR)

(73) Assignee: Honeywell International Inc., Morristown, NJ (US)

( * ) Notice: Subject to any disclaimer, the term of this patent is extended or adjusted under 35 U.S.C. 154(b) by 266 days.

(21) Appl. No.: 10/588,393

(22) PCT Filed: Feb. 5, 2004

(86) PCT No.: PCT/EP2004/001069

§ 371 (c)(1),
(2), (4) Date: Mar. 12, 2007

(87) PCT Pub. No.: WO2005/076461

PCT Pub. Date: Aug. 18, 2005

(65) Prior Publication Data

US 2007/0251236 A1 Nov. 1, 2007

(51) Int. Cl.
*H02P 27/06* (2006.01)

(52) U.S. Cl. .................. 318/807; 318/162; 318/808; 318/812

(58) Field of Classification Search .............. 318/727, 318/807–812, 162, 163, 479, 504; 388/912; 60/608
See application file for complete search history.

(56) References Cited

U.S. PATENT DOCUMENTS

| 3,836,756 | A   |   | 9/1974  | Yammoto et al.          |
|-----------|-----|---|---------|-------------------------|
| 3,974,428 | A   |   | 8/1976  | Hafle                   |
| 4,047,083 | A   | * | 9/1977  | Plunkett ......... 318/807 |
| 4,099,109 | A   | * | 7/1978  | Abbondanti ...... 318/811 |
| 4,680,526 | A   | * | 7/1987  | Okuyama et al. ... 318/802 |
| 4,720,777 | A   | * | 1/1988  | Yokoi ............ 363/41 |
| 5,965,995 | A   | * | 10/1999 | Seibel et al. .... 318/805 |
| 7,436,144 | B2  | * | 10/2008 | Yoshimura et al. .. 318/599 |

FOREIGN PATENT DOCUMENTS

| WO | WO2005076461      | 8/1976  |
| WO | PCT/EP2004/001069 | 10/2004 |

* cited by examiner

*Primary Examiner*—Bentsu Ro
(74) *Attorney, Agent, or Firm*—Chris James

(57) ABSTRACT

The invention proposes a system for driving a compressor, comprising an induction motor (2) for driving the compressor (3), said induction motor including a squirrel cage rotor, and a controller (1) for controlling the induction motor, said controller comprising a memory for storing drive patterns for driving the induction motor, a first frequency generation means for generating a field frequency based on a field command and/or a second field generation means for generating a voltage frequency based on a voltage command, wherein a drive pattern in extracted from the memory based on the generated frequency or frequencies. Alternatively, the invention proposes a system for driving a compressor, comprising an induction motor (2) for driving the compressor (3), said induction motor including a squirrel cage rotor, and a controller (1) for controlling the induction motor, wherein the controller is adapted to distinguish between a steady state and a transient state of the induction motor.

13 Claims, 7 Drawing Sheets

MOTOR CONTROL AND DRIVER FOR ELECTRIC BOOSTING APPLICATION

FIELD OF THE INVENTION

The invention relates to a system for driving an electrically driven compressor, or an electrically assisted turbocharger.

BACKGROUND OF THE INVENTION

A compressor serves to compress air, and an important application thereof is the use in a turbocharger. A turbocharger compresses the air flowing into an engine in order to supply more air into a cylinder. In this way, more fuel can be added so that more power can be obtained from a cylinder compared to a case in which no turbocharger is used.

A turbocharger is constituted by a compressor and a turbine, which is rotated by exhaust gas of the engine. The turbine, i.e., the turbine wheel is connected to the compressor wheel by a shaft. Hence, the rotation of the turbine drives the compressor, which in turn compresses ambient air supplied thereto and feeds it to the cylinder(s) of the engine.

A main problem with turbochargers is that they do not provide an immediate power boost when it is requested, e.g., by operating an accelerator pedal in a vehicle. Namely, it takes some time for the turbine to reach the necessary speed before a boost can be produced. This time length is also referred to as "turbo lag".

As a measure for handling this problem it has been proposed to employ an auxiliary electric machine, by which the turbocharger is assisted in supercharging the engine. Moreover, the electric machine, when arranged as a motor/generator, may also be used to charge a battery or directly supply power to electrical consumers. For example, document U.S. Pat. No. 5,406,797 describes such a turbocharger, in which a rotary electric machine is used, which may be a squirrel cage induction machine.

However, for a turbocharger high speeds are necessary, which may reach up to 250 kRPM. That is, the electric machine and a corresponding electronic controller for the electric machine must have high speed capability. In addition, a high low end torque, a high overall efficiency should be achieved, and the components should also comply with a high temperature environment.

In addition, in case a mass production is intended, a low cost solution is mandatory, in particular for the electronic controller.

Another possibility to improve the turbolag issue is to add an electrically driven compressor in serial (before or after a standard turbocharger). In that case, constraints on motor design are very similar, but for the speed which is lower (120 kRPM).

Therefore, the present application is directed to driving a turbocharger or an electrically driven compressor (also called electric boosting system) with an electric motor, using, e.g., a vehicle electric network.

SUMMARY OF THE INVENTION

Hence, it is an object of the present invention to provide a system for driving a compressor which can be operated at high speeds.

This object is solved by a system for driving a compressor, comprising an induction motor for driving the compressor, said induction motor including a squirrel cage rotor, and a controller for controlling the induction motor, said controller comprising a memory for storing drive patterns for driving the induction motor, a first frequency generation means for generating a field frequency based on a field command and/or a second frequency generation means for generating a voltage frequency based on a voltage command, wherein a drive pattern is extracted from the memory based on the generated frequency or frequencies.

That is, according to the invention, drive patterns are stored beforehand and are extracted from a memory based on a field command and/or on a voltage command.

Since the control is based on a drive pattern stored beforehand, the response thereof is significantly improved. Moreover, since the access to the memory is based on the frequency which is generated from a voltage signal, the access to the memory can be effected very fast.

Hence, a control with a fast response for the compressor can be achieved.

The controller may comprises a processing means for generating the field command and/or the voltage command based on an input request.

The controller may be adapted to distinguish between a steady state and a transient state of the induction motor. In this way, the controller can set its control strategy based on the state, i.e., steady state or transient state of the induction motor.

In particular, the controller (i.e., the processing means for generating the field command and the voltage command) may be adapted to generate the field command and/or the voltage command depending on the state of the asynchronous motor.

The field command and/or voltage command may be generated based on look-up tables. In this way, the response can be further improved.

The field command and/or voltage command may be generated based on a model based control.

According to a second aspect of the invention, the object is solved by a system for driving a compressor, comprising an induction motor for driving the turbocharger for driving the compressor, said induction motor including a squirrel cage rotor, and a controller for controlling the induction motor, wherein the controller is adapted to distinguish between a steady state and a transient state of the induction motor.

Hence, the compressor can be driven depending on whether the induction motor is in a steady state or in a transient state. Namely, in a transient state a control strategy is necessary which differs from that in a steady state. For example, a feedback control requires a certain amount of calculations, which can be easily performed in a steady state. However, when the same kind of feedback control is performed in a transient state, it is possible—depending on the capability of the controller—that the controller cannot accurately follow the speed change of the motor, in particular in case of a high-speed application as in a turbo-charger. Thus, in a transient state, another kind of feedback control may be applied, so that always a proper control of the induction motor can be achieved.

The controller may be adapted to control the induction motor depending on the state of the induction motor.

The controller may generate a field command and/or a voltage command dependent on the state of the induction motor.

The field command and/or voltage command may be generated based on look-up tables. In this way, a fast response of the control may be achieved, since no complicated calculations are necessary.

The field command and/or voltage command may be generated based on a model based control. In this way, a very reliable and exact control may be achieved.

The controller may comprise a memory for storing drive patterns for the induction motor, a first frequency generation means for generating a field frequency based on a field command and/or a second frequency generation means for generating a voltage frequency based on a voltage command, wherein a drive pattern is extracted from the memory based on the generated frequency or frequencies.

Hence, in this way the advantages of the first aspect and the second aspect of the invention can be combined.

The controller may comprise a processing means for generating the field command and/or the voltage command based on an input request.

The first and/or the second frequency generation means may be a voltage controlled oscillator. Hence, an input voltage signal can easily be converted into the frequency signal.

The system may further comprise a counter receiving the frequency output of the frequency generation means, wherein the counter is adapted to count a value based on the frequency of the frequency generation means, and the frequency is used as an address for accessing the memory.

The first frequency generation means may be used for generating the field frequency and the second frequency generation means may be used for generating a voltage frequency, wherein the memory is accessed by using a first address and a second address, and the system further comprises a first counter and a second counter, wherein the first counter is adapted to count a value based on the frequency of the first frequency generation means, and the second counter is adapted to count a value based on the frequency of the second frequency generation means, wherein the count value of the first frequency generation means is used as the first address, and the count value of the second frequency generation means is used a second address.

One of the first and second addresses may be a column address, and the other address of the first and second addresses may be a line address.

The compressor may be a part of a turbocharger. Namely, as mentioned above, the invention can be applied most advantageously when the induction motor is driven at high speeds, such as the compressor in a turbocharger.

In detail, the compressor may be an electrically driven compressor, or may be part of an electrically assisted turbocharger.

BRIEF DESCRIPTION OF THE DRAWINGS

The invention is described in the following by referring to the drawings in which.

DESCRIPTION OF THE PREFERRED EMBODIMENTS

In the following, preferred embodiments of the invention are described.

As already described above, the invention is directed to driving a turbocharger or an electrically driven compressor with an electric motor. That is, the invention can be used for an electrically driven compressor, or an electrically assisted turbocharger. In both case, the motor is switched on only during short transient phases where turbolag is to be compensated.

Such a system is also referred to as an electric boosting system (EBS). When adapting such a system in a vehicle, preferably the vehicle electrical network is used as an electrical power source. The electric motor and its electronic controller must have high speed capability (up to 250 kRPM), high low end torque, high overall efficiency and comply with high temperature environment. Moreover, in case a mass production is intended, low cost solutions are mandatory, particularly for the electronic controller.

Thus, the hardware architecture (electronic controller & induction motor) of the system along with control strategy are of concern for the invention.

The hardware and software architectures according to the present invention aim at providing:

Fast time response (for the electric motor and the electronic controller)
High torque to the turbocharger/compressor shaft
High efficiency of the overall electric system
No induced losses from the electric motor when the motor is OFF
No magnetic limitation at high environment temperature
System adaptability/Implementation simplicity of the electronics
Control accuracy
Low cost application Selecting the best electric motor technology together with a smart control strategy and a simple but efficient electronic controller architecture solves these problems.

In the following, the present invention is described in more detail by referring to a preferred embodiment of the invention, in which a turbocharger is driven by a squirrel cage induction motor.

The system according to the present embodiment is divided into two main hardware sections:

squirrel cage induction motor
electronic controller using specific hardware and software At first, the overall architecture of the EBS (electronic boost system) electric function is described. After this, two sub systems will be described, namely a control strategy for driving the induction motor and an electronic controller architecture.

Figure 1:
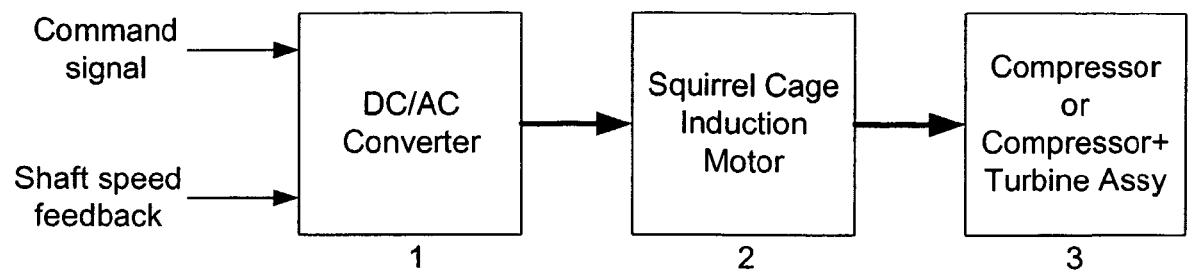
FIG. 1 shows an overall architecture of the electric function of an electric boosting system according to an embodiment of the present invention.

The overall architecture of the EBS electric function is illustrated in FIG. 1.

Reference numeral 1 denotes a DC/AC converter, which generates AC currents for driving a squirrel cage induction motor based on a command signal and a shaft speed feedback signal as input signals. The command signal can be a speed command (target speed for the shaft) or a power command (electrical power draw requested from the battery/VEN Vehicle Electrical Network) or mechanical power to the shaft.

The squirrel cage induction motor 2 drives a compressor/turbine assembly of a turbocharger. According to a modification of the present embodiment, the squirrel cage induction motor 2 may drive only a compressor.

The use of an induction motor allows several advantages. For example, no additional electromagnetic losses are generated when the electric motor is off (and the rotor is driven by the turbocharger rotation), since there is no magnetic field created. Furthermore, electromagnetic losses can be controlled by the electronic controller using simple field weakening method. Moreover, a reduced sensitivity of the magnetic field to environment temperature can be achieved, since no magnets are used.

Figure 2:
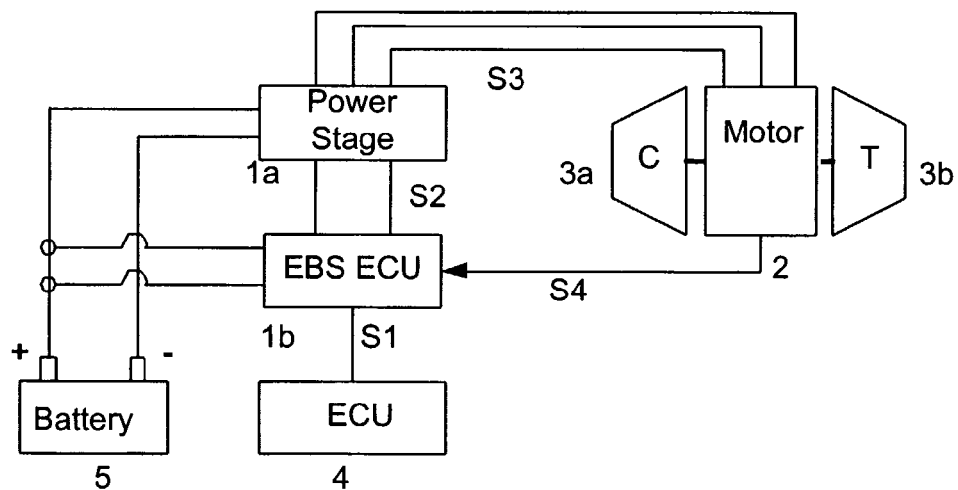
FIG. 2 shows an electrically assisted turbocharger according to the embodiment of the present invention.

The present embodiment is shown in some more detail in FIG. 2, which shows an electrically assisted turbocharger (e-Turbo™). Here, the DC/AC converter 1 shown in FIG. 1 is illustrated in two parts, namely a power stage 1a and an EBS ECU (EBS electronic control unit) 1b. The EBS ECU 1b receives the command signal S1 from an ECU (electronic control unit) 4. The command signal may be a PWM (pulse width modulation) signal, a CAN (car area network) BUS signal, an analog voltage signal or another suitable signal form. Moreover, the line over which the command signal S1 is sent is bi-directional, so that the ECU 4 and the EBS ECU can exchange commands, information and the like in both directions.

The EBS ECU 1b provides necessary power stage driver signals S2, i.e., the driver signals which are necessary to drive an inverter included in the power stage 1a. Reference numeral S3 denotes motor phase power signals which are applied to the respective phases of the induction motor 2. As shown in FIG. 2, the motor 2 drives an assembly of a compressor 3a and a turbine 3b, i.e., a turbocharger.

Reference numeral S4 denotes a speed feedback signal, and which indicates the speed of the shaft of the motor and is used for control strategies. This supplied to the EBS ECU 1b. The speed signal S4 can be supplied by a speed detector (e.g., a resolver or the like), an optical sensor, a magnetic sensor and the like, or even the speed can be computed, without using a speed sensor, using a sensorless strategy (basically for a sensorless strategy the magnetic field coming from the rotor is measured across the stator phase winding that is not supplied in current at this moment, based on this measurement, the speed can be computed).

Furthermore, a 12 V battery 5 (as used in a car, for example) supplies power to the DC/AC converter 1, i.e., the EBS ECU 1b and the power stage 1a. It is however noted that also other batteries supplying different voltage values (e.g., 24 V or the like) may be applied.

Figure 3:
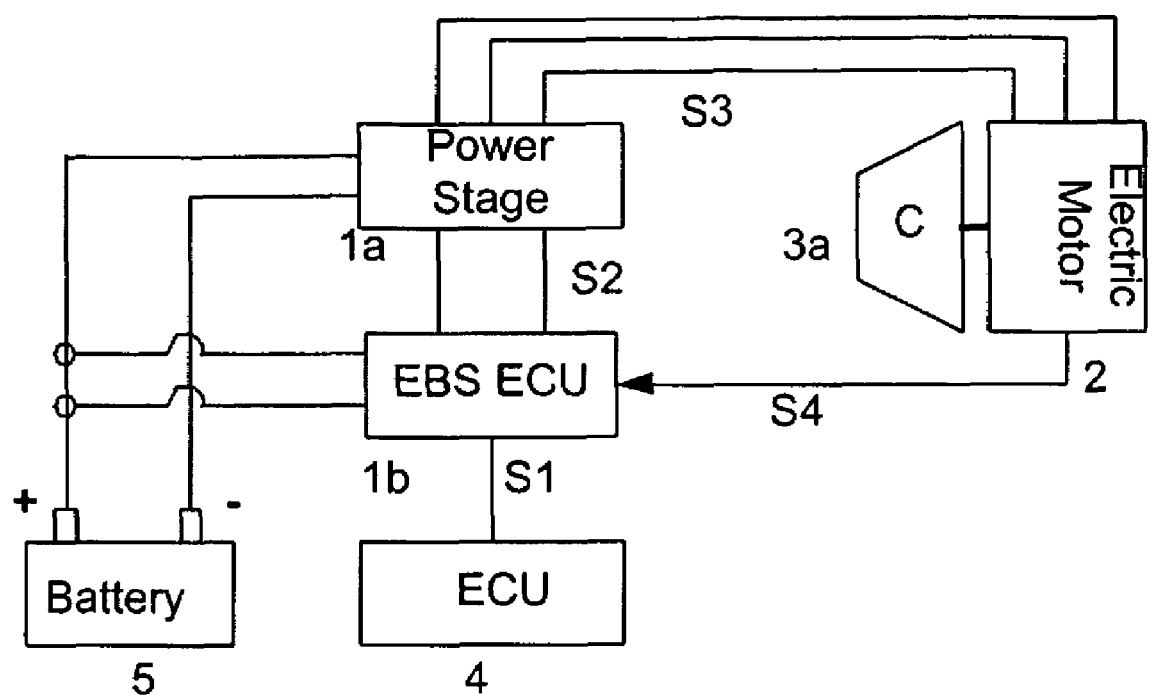
FIG. 3 shows an electrically driven compressor according to a modification of the embodiment of the present invention.

A modification of the present embodiment is shown in FIG. 3, which shows an electrically driven compressor (e-Charger™). The basic operation thereof is basically the same as that of the system shown in FIG. 2, and same elements are denoted with same reference numerals. Both system differ only in the fact that the system according to FIG. 2 does not comprise a turbine.

Figure 4:
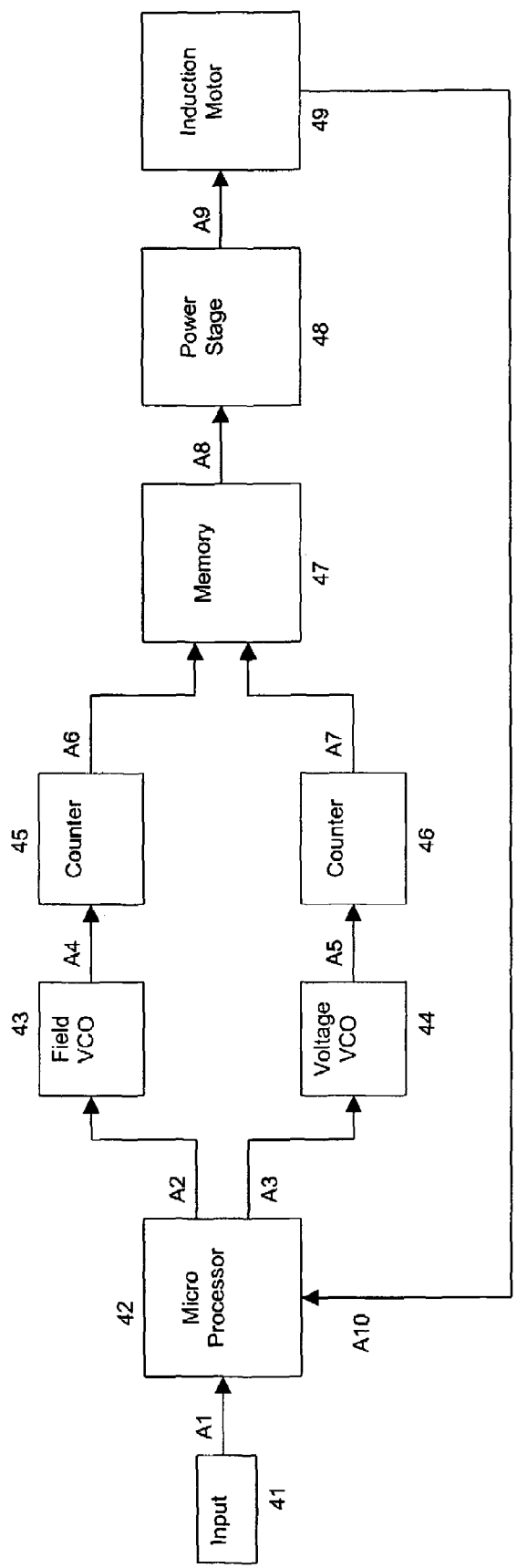
FIG. 4 shows a hardware layout of the turbocharger or compressor driving system according to the present embodiment.

First, the hardware architecture for the logic side of the electronic controller according to the present embodiment is described by referring to FIG. 4 which shows a hardware layout of the turbocharger or compressor driving system according to the present embodiment. This hardware layout is a mix of microprocessor, VCOs, Counters and EPROM. This logic side will then drive the power stage 1a (classical H-bridge architecture using MOSFETs, for example).

In particular, the EBS ECU 1b shown in FIG. 2 is illustrated in FIG. 4 in more detail. An input request A1 (corresponding to the command signal S1) is received via an input terminal 41 and supplied to a micro processor 42. It is noted that the input request A1 may assume different forms, as described above with respect to the command signal S1. The microprocessor 42 generates a Field Frequency Command-V A2 (also referred to as FFC-V) and a Phase Voltage Command-V A3 (also referred to as PVC-V) based on the input request (and also based on the speed feedback signal S4). The Field Frequency Command-V A2 and the Phase Voltage Command-V A3 are both analog voltage values, therefore they are indicated with "-V".

The Field Frequency Command-V A2 is converted to a Field Frequency Command-Hz A4 (also referred to as FFC-Hz) by a field VCO 43 (voltage controlled oscillator, an oscillator with adjustable frequency values). The Phase Voltage Command-V A3 is converted to a Phase Voltage Command-Hz A5 (also referred to as PVC-Hz) by a voltage VCO 44. The outputs of the VCOs are denoted by "-Hz" in order to indicate that they are actually frequency values.

These two frequency commands A4 and A5 are supplied to counters 45 and 46, respectively, which generate counter values to be used as addresses (as will be explained in more detail later). The counter values, signals A6 and A7, are supplied to a memory 47, which may be an EPROM (erasable progammable read-only memory). Based on the counter values A6 and A7, a pattern, i.e., a PWM sequence A8 is extracted from the memory. That is, the PWM sequence A8 corresponds to the power stage signals S2 sent to the power stage 48 (denoted with reference sign 1a in FIG. 2), which in turn generates the phase currents S3, i.e., a motor command sequence A9 for the induction motor 49 (denoted with reference sign 2 in FIG. 2).

Furthermore, a speed feedback signal A10 is sent from the induction motor 49 to the microprocessor 42.

Figure 5:
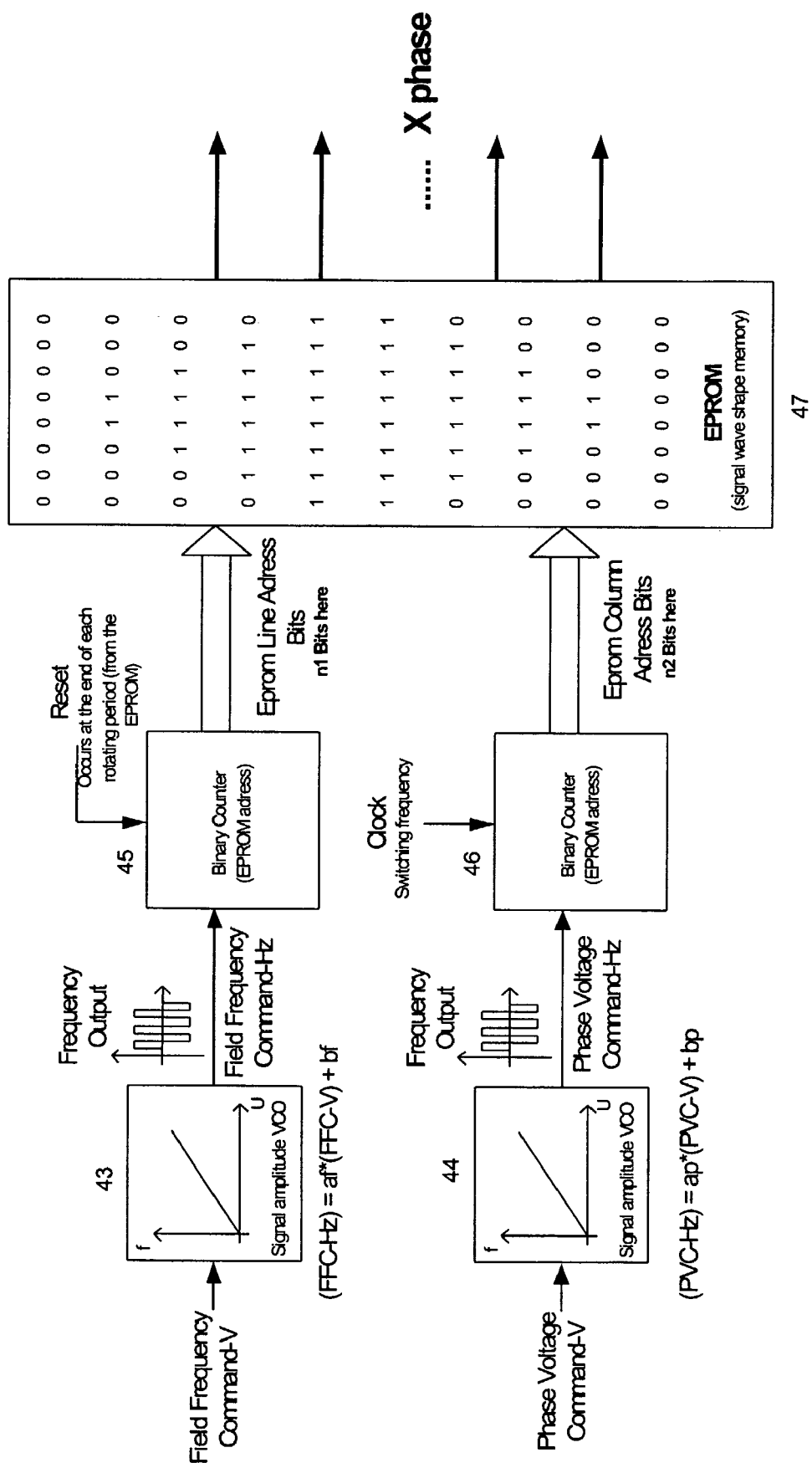
FIG. 5 illustrates a VCO-EPROM architecture shown in FIG. 4 in more detail.

The VCO-EPROM architecture is shown in more detail in FIG. 5.

In particular, by the two diagrams indicating the field VCO 43 and the voltage VCO 44 on the left side of FIG. 5 it is illustrated how the Field Frequency Command-Hz is generated from the Field Frequency Command-V, and how the Phase Voltage. Command-Hz is generated from the Phase Voltage Command-V. Namely, the conversion from the voltage values to the frequency values can be expressed by following formulas:

$$(FFC\text{-}Hz) = af^*(FFC\text{-}V) + bf$$

$$(PVC\text{-}Hz) = ap^*(PVC\text{-}V) + bp$$

The values af and bf are specific for the FFC-Hz generation, and the values ap and bp are specific for the PVC-Hz generation. Hence, as also derivable from the diagrams, there is a linear relation.

The frequency outputs are used to access the EPROM. This is performed by supplying the frequency outputs to the counters 45 and 46.

In detail, FFC-Hz is supplied to the counter 45, which is a first binary counter. On this counter, the FFC-Hz is the clock and a reset is used. The reset is provided by one bit from the EPROM. Namely, the reset bit in the EEPROM occurs at the end of each rotating period.

The PVC-Hz signal is given to the second counter 46, which may also be a binary counter. It is used as a reset and is used to change the voltage applied to the stator phases. The other input used on this counter is a clock, switching at a given frequency.

The EPROM is a memory that contains a certain content. For a given input address, a given output set of bits (i.e., a drive pattern for the power stage) is given by the EPROM and sent to the power stage. The content may be structured so that the corresponding drive pattern (also referred to as switching pattern) for each phase is output in parallel. Hence, FIG. 5 shows an output to "X phases".

In detail, the content of the EPROM is arranged such that the address given by FFC-Hz refers to the line address. In this particular example, the line address bits comprise n1 bits. The value output by the second counter indicates the EPROM column address bits, which comprise in this example n2 bits.

That is, the content of the EPROM is structured in a two dimensional map.

Figure 6:
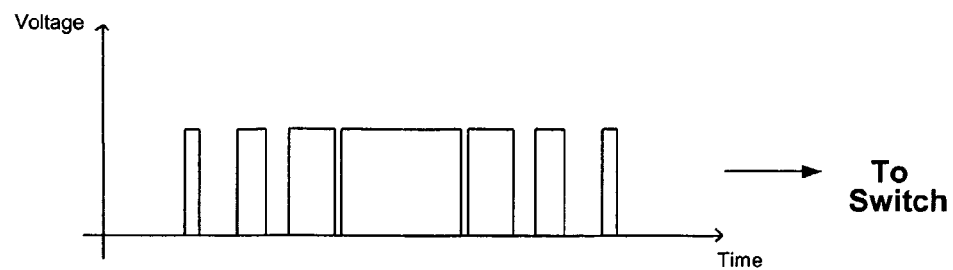
FIG. 6 shows an example for a drive pattern obtained from the EPROM according to the present embodiment.

FIG. 6 shows the switching pattern that can be obtained with the architecture shown in FIG. 5. It is noted that FIG. 6 shows an output signal from the EPROM for one phase for a given VCO configuration.

It is noted that FIG. 5 only shows an example of the structure used, the size of the counters and the content of the EPROM are not representative of what has been used for the EBS application. For example, the addresses of the EPROM may comprise much more than three or four bits in order to enhance the resolution of the drive patterns.

Thus, by using such an electronic controller architecture according to the embodiment a fast time response of the electronics is possible since only a few components are used.

In particular, the combination of a VCO and a counter allows a very fast generation of the address. Namely, the VCO can quickly provide the frequency signals based on the input analog voltage signal, and the counter simply counts the pulses sent from the VCO. Hence, a very broad frequency range can be achieved, which is higher than in a conventional automotive microprocessor.

The hardware implementation can easily be effected, since, for example, the VCOs frequency range can be upgraded easily to drive the induction motor within various frequency ranges.

As an alternative, the frequency generation could also be effected by using a dedicated hardware such as ASIC (Application Specific Integrated Circuit), FPGA (Field Programmable Gate Array), microprocessor, CPLD (Complex Programmable Logic Device), instead of the VCO.

Furthermore, the control can easily be adapted to different applications. Namely, the EPROM contains various drive patterns for various types of drive strategy, for example. Moreover, in case of using a different type of induction motor or in case of using a improved switching patterns for the same motor, the EPROM containing the switching patterns can easily be replaced or reprogrammed. A pattern switch can also be used during operation with different output, depending on whether the operation mode is a transient or a steady state operation mode.

In the following, the control strategy algorithm according to the present embodiment is described in more detail.

It is noted that in the following only the speed input request has been considered in order to simplify the description. However, all the description can easily be transposed for other types of input request (e.g., higher torque or the like).

Figure 7:
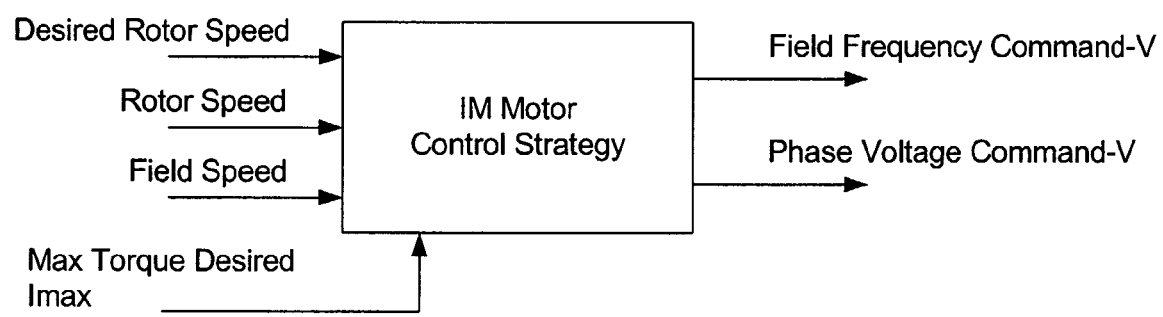
FIG. 7 illustrates the general outline of the control strategy implemented in the microprocessor according to the present embodiment.

In order to drive properly an induction motor, the controller has to set at every loop time an optimal value for both phase voltage and field frequency. This is performed through specific algorithms, as will be shown later. FIG. 7 shows inputs/outputs (I/O) of the control strategy implemented in the microprocessor according to the present embodiment.

As illustrated in FIG. 7, the commands FFC-V and PVC-V described in the foregoing are generated using the IM motor control strategy based on the desired rotor speed, the actual rotor speed, the actual field speed and a command indicating a maximum desired torque and/or a maximum desired current Imax (drawn from the battery or sent to the stator).

Figure 8:
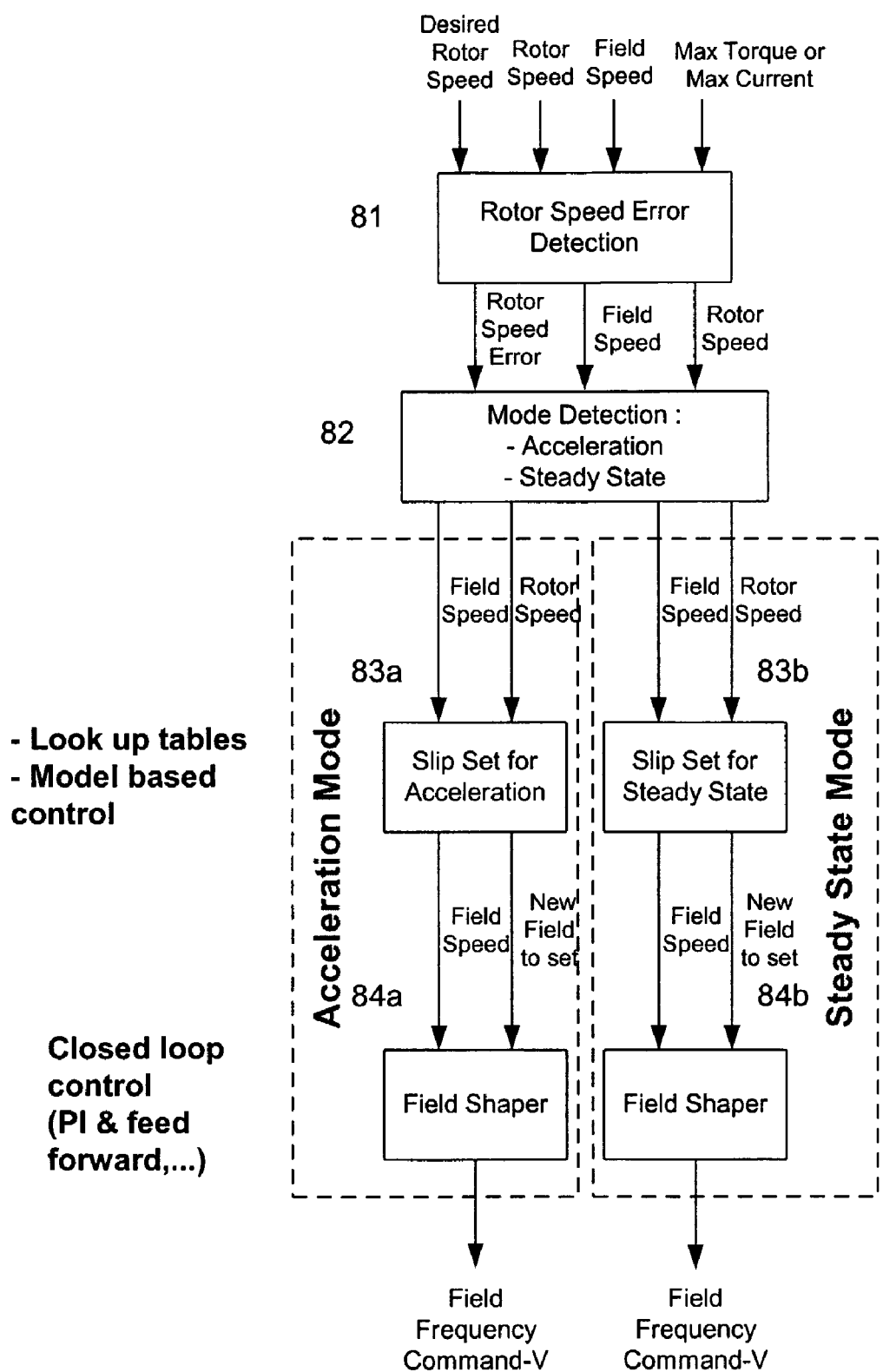
FIG. 8 shows a detailed algorithm for the generation of a Field Frequency Command-V according to the present embodiment.

FIG. 8 shows the detailed algorithm for the generation of the Field Frequency Command-V.

At every loop time, a first logic decides whether the motor is in acceleration (fast transient) or steady state (slow variation) mode, based on actual and set value for the shaft speed. Then, a set value for the slip (in acceleration or in steady state mode) is obtained from a look up table experimentally filled, or by using a more sophisticated technique such as model based algorithm. Eventually, the field frequency value command is computed by a closed loop controller (for example Proportional Integral with a feed-forward term), or a more sophisticated controller.

Note on difference between steady state and acceleration modes: The transient mode has been implemented to provide very fast accelerations and then reach a high transient torque. The steady state mode has been implemented to offer a regulated speed, for a given speed target. That is, the steady state mode does not imply that the speed is actually constant, but that only small changes, i.e., small accelerations occur.

The above algorithm is described in the following in more detail. The above mentioned desired rotor speed, the actual rotor speed and the actual field speed are supplied to a first block in which a rotor speed error detection is performed. That is, in block 81 the difference between the desired rotor speed and the actual rotor speed is determined, and this difference is supplied to a second block 82, along with the actual rotor speed and the actual field speed.

In block 82, a mode detection is performed. That is, it is detected whether the induction motor is a transient state (e.g., acceleration state) or in a steady state. This is performed by evaluating the rotor speed error, for example. That is, in case the rotor speed error exceeds a certain threshold, it is determined that the induction motor is in an acceleration mode.

It is noted that in the present example only the difference between the steady state mode and the acceleration mode is important. However, if desired, based on the sign (+/−) of the rotor speed error, it can also be detected whether the induction motor is in a deceleration mode. That is, based on the absolute value of the rotor speed error, it can be determined whether the induction motor is in a steady state mode or in a transient mode, and based on the sign of the rotor speed error, it can be determined whether the induction motor is in an acceleration or deceleration mode.

On the other hand, when the rotor speed error is below the threshold, it is determined that the induction motor is in a steady state.

Based on the detected state of the induction motor, different control strategies are employed, as illustrated in FIG. 8 by blocks 83a and 84a for the acceleration mode, and by blocks 83b and 84b for the steady state mode.

In detail, in case the induction motor is in the acceleration mode, block 82 sends field speed and rotor speed to the block 83a, in which a proper slip set for acceleration is generated based on the obtained values. The block 83a may contain look-up tables in which the slip set is stored. Alternatively, block 83 may contain a model for the system, so that a model based control is carried out and the slip set is generated based on the model.

Based on the slip set for acceleration obtained in block 83a, a field speed command and a new field to set command (new field speed command) is forwarded to a block 84a, which contains a field shaper. Block 84a may perform a closed loop control (PI and feed forward, etc.) or the like. In this way, the field shaper (block 84a) generates the Field Frequency Command-V (FFC-V), which is then forwarded to the field VCO, as described in the foregoing with respect to FIG. 5.

On the other hand, in case the induction motor is in the steady state mode, block 82 sends field speed and rotor speed to the block 83b which generates a slip set for the steady state. Similar to block 83a for the acceleration mode, this block may contain a look-up table or may carry out a model based control.

The field speed command and new field to set command is sent to the block 84b, which comprises a field shaper and which generates the Field Frequency Command-V, similar as block 84a. However, the control applied in block 84b may differ from that applied in block 84a.

Figure 9:
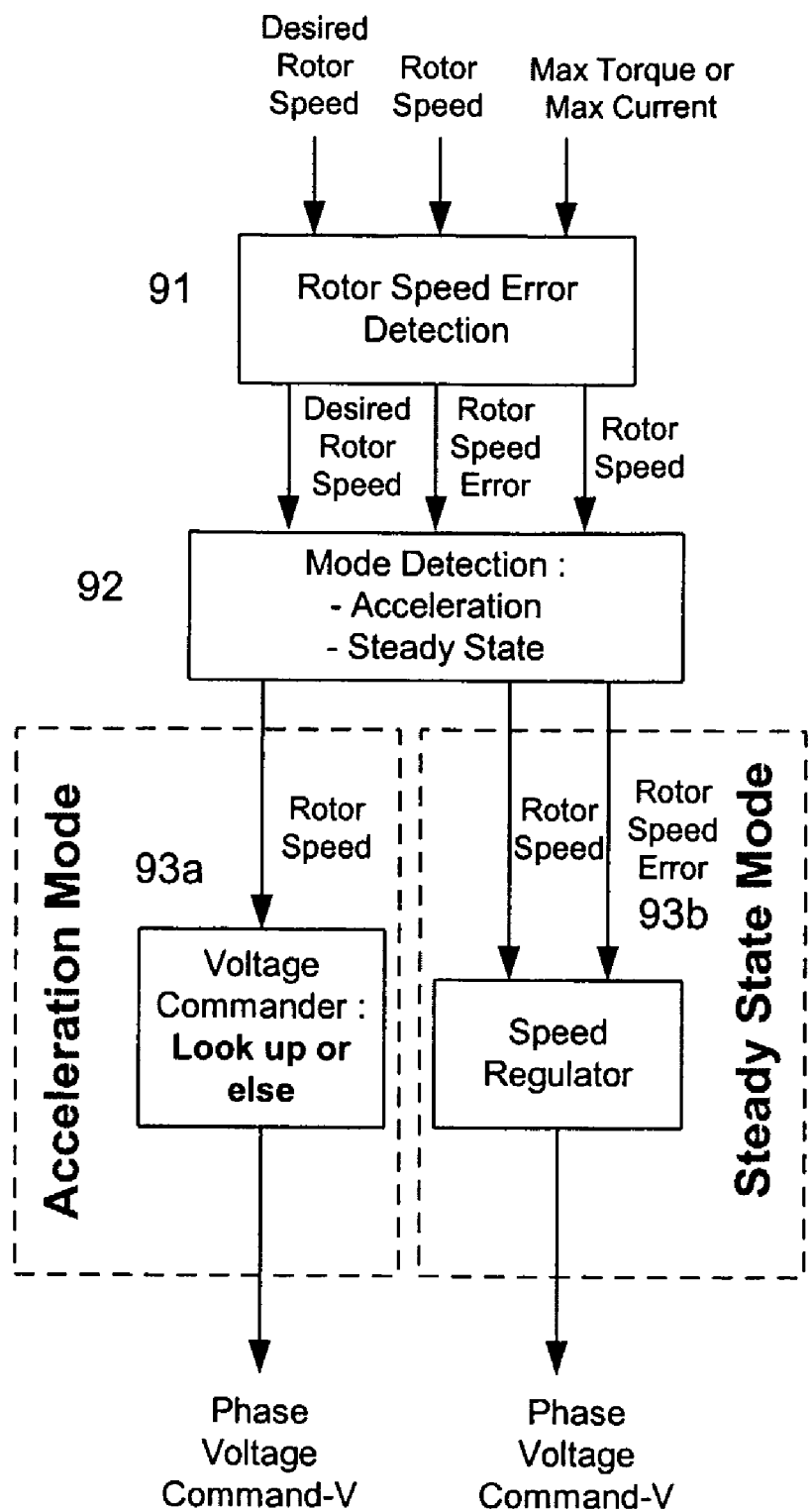
FIG. 9 shows a detailed algorithm for the generation of the Phase Voltage Command-V according to the present embodiment.

FIG. 9 shows the detailed algorithm for the generation of the Phase Voltage Command-V according to the present embodiment of the invention.

At every loop time, a first logic decides whether the motor is in acceleration (fast transient) or steady state (slow variation) mode, based on actual and set value for shaft speed. In acceleration mode, a set value for the phase voltage can be obtained from a look up table experimentally filled, or using more sophisticated technique such as model based algorithm. In steady state mode, the phase voltage is computed by a closed loop controller (for example Proportional Integral with a feed-forward term, or a more sophisticated controller) in order to reach speed set value.

This is described in the following in more detail. Similar to the case shown in FIG. 8, the above mentioned desired rotor speed and the actual rotor speed are supplied to a first block 91 in which a rotor speed error detection is performed. That is, in block 91 the difference between the desired rotor speed and the actual rotor speed is determined, and this difference is supplied to a second block 92, along with the actual rotor speed.

Similar as in block 82 shown in FIG. 8, mode detection is performed. That is, it is detected whether the induction motor is a transient state (e.g., acceleration state) or in a steady state. This is performed in the same way as described in the foregoing with reference to block 82.

It is noted that the blocks 81 and 82 on the one hand and the blocks 91 and 92 do not have to be separate blocks for generating the Field Frequency Command and the Phase Voltage Command. That is, the arrangement of FIG. 9 may also use the blocks 81 and 82 of FIG. 8 and use the detection result of block 82 in order to detect the mode of the induction motor.

Based on the detected state of the induction motor, different control strategies are employed, as illustrated in FIG. 9 by a block 93a a for the acceleration mode, and by a block 93b for the steady state mode.

In detail, in case the induction motor is in the acceleration mode, block 92 sends the rotor speed to the block 93a, in which a correct Phase Voltage Command-V (PVC-V) is provided. In detail, block 93a comprises a voltage commander which commands a voltage value based on a rotor speed. For example, this can be effected by a look-up table.

It is noted that by providing the voltage commander (i.e., no feedback control or the like) in block 93a, the response time of the control for the acceleration mode is enhanced.

On the other hand, in case the induction motor is in the steady state mode, block 92 sends the rotor speed and the rotor speed error to the block 93b which generates the corresponding Phase Voltage Command-V. In contrast to block 93b, this is effected by using a voltage controller, which performs a PI control or a feed forward control, for example, based on the rotor speed and the rotor speed error.

Hence, in the steady state mode a very exact control can be achieved.

By the control strategy according to the present embodiment described in the foregoing with reference to FIGS. 8 and 9, a fast time response of the induction motor is possible. Moreover, a high torque capability is possible. Furthermore, the number of computations is limited and hence small microprocessor can be used. This also leads to the fact that the process can be carried out very fast.

In addition, a high accuracy of the control can be achieved, which leads to a high efficiency of the motor.

The invention is not limited to the embodiment and its modification described above.

For example, the invention in its general form can be applied to a system for driving a compressor, in which only the induction motor including the squirrel cage rotor driving the compressor and the controller is included, as shown in FIG. 3, for example. In this case, the controller comprises a memory in which drive patterns of the induction motor are stored, and a first voltage controlled oscillator generates a field frequency based on a field command and a second voltage controlled oscillator for generates a voltage frequency based on a voltage command. The drive pattern is then extracted from the memory based on the field frequency and the voltage frequency.

Moreover, according to the embodiment and its modification described in the foregoing, the Field Frequency Command and the Phase Voltage Command are generated and used for accessing the EPROM. However, it is possible that only one parameter is used, e.g. either the frequency command or the Phase Voltage Command. In this case, only one voltage controlled oscillator and only one counter is provided. Then, the EPROM is accessed based only on a line address, for example. That is, in this case the content of the EPROM is arranged only as one-dimensional map.

Furthermore, the memory used for storing drive patterns is not limited to an EPROM. Instead, other suitable memory types may be used, for example other kinds of read only memories such as an ordinary ROM, a PROM (programmable read-only memory), an EEPROM (electrically erasable programmable read-only memory) or the like. Alternatively, also random access memories (RAM) may be used, e.g. such as an ordinary RAM, SDRAM, DDRAM and the like.

Moreover, as already mentioned before, instead of the VCO also a dedicated hardware such as ASIC, FPGA, microprocessor, CPLD my be used in order to generate the necessary frequencies.

The invention claimed is:

1. A system for driving a compressor, comprising
an induction motor (2) for driving the compressor (3a), said induction motor including a squirrel cage rotor, and
a controller (1) for controlling the induction motor, said controller comprising
a memory (47) for storing drive patterns for driving the induction motor,
a first frequency generation means (43) for generating a field frequency based on a field command and/or
a second frequency generation means (44) for generating a voltage frequency based on a voltage command,
wherein a drive pattern is extracted from the memory based on the generated frequency or frequencies.

2. The system according to claim 1, wherein the controller comprises a processing means (42) for generating the field command and/or the voltage command based on an input request.

3. The system according to claim 1, wherein the controller is adapted to distinguish between a steady state and a transient state of the induction motor.

4. The system according to claim 3, wherein the processing means (42) is adapted to generate the field command and/or the voltage command depending on the state of the induction motor.

5. The system according to claim 4, wherein the field command and/or voltage command is generated based on look-up tables.

6. The system according to claim 4, wherein the field command and/or voltage command is generated based on a model based control.

7. The system according to claim 1, wherein the first and/or the second frequency generation means (43, 44) is a voltage controlled oscillator.

8. The system according to claim 1, further comprising a counter (45, 46) receiving the frequency output of the frequency generation means (43, 44),
wherein the counter is adapted to count a value based on the frequency of the frequency generation means, and
the frequency is used as an address for accessing the memory (47).

9. The system according to claim 1, wherein the first frequency generation means (43) for generating the field frequency and the second frequency generation (44) means for generating a voltage frequency is used, wherein
the memory (47) is accessed by using a first address and a second address, and the system further comprises a first counter (45) and a second counter (46), wherein
the first counter is adapted to count a value based on the frequency of the first frequency generation means, and the second counter is adapted to count a value based on the frequency of the second frequency generation means, wherein
the count value of the first frequency generation means is used as the first address, and the count value of the second frequency generation means is used as the second address.

10. The system according to claim 9, wherein one of the first and second addresses is a column address, and the other address of the first and second addresses is a line address.

11. The system according to claim 1, wherein the compressor (3a) is a part of a turbocharger (3).

12. The system according to claim 1, wherein the compressor is an electrically driven compressor.

13. The system according to claim 1, wherein the compressor is part of an electrically assisted turbocharger.

* * * * *